(12) United States Patent
de Boer et al.

(10) Patent No.: US 6,271,308 B1
(45) Date of Patent: Aug. 7, 2001

(54) BLOCK COPOLYMERS

(75) Inventors: Bert de Boer, Peize; Erik Kroeze, Groningen; Georges Hadziioannou; Gerrit ten Brinke, both of Peize, all of (NL)

(73) Assignee: Rijksuniversiteit te Groningen (NL)

( * ) Notice: Subject to any disclaimer, the term of this patent is extended or adjusted under 35 U.S.C. 154(b) by 0 days.

(21) Appl. No.: 09/202,856

(22) PCT Filed: Jun. 24, 1997

(86) PCT No.: PCT/NL97/00352
§ 371 Date: Mar. 22, 1999
§ 102(e) Date: Mar. 22, 1999

(87) PCT Pub. No.: WO97/49741
PCT Pub. Date: Dec. 31, 1997

(30) Foreign Application Priority Data

Jun. 25, 1996 (NL) .................................................... 1003421

(51) Int. Cl.[7] .................................................... C08L 53/00
(52) U.S. Cl. ............................ 525/88; 525/238; 525/239; 525/240; 525/294; 524/504; 524/505
(58) Field of Search ............................... 525/88, 239, 240, 525/238, 294; 524/504, 505

(56) References Cited

U.S. PATENT DOCUMENTS 4,107,130 * 8/1978 Gergen et al. ...................... 260/40 R
4,169,115 * 9/1979 Tung et al. ........................... 525/314

* cited by examiner

Primary Examiner—James J. Seidleck
Assistant Examiner—Olga Asinovsky
(74) Attorney, Agent, or Firm—Norris, McLaughlin & Marcus P.A.

(57) ABSTRACT

The present invention relates to a stable polymer composition comprising a first polymer and a second polymer, which second polymer is not compatible with the first polymer, and an amount of a copolymer comprising at least one block of a polyalkadiene and at least one block of random poly (aromatic vinyl-acrylonitrile), and in which the ratio of the block copolymer to the total polymer composition is between 1:500 and 1:50. Besides, the invention relates to the use of the above block copolymer as compatibilizer and/or as modifier for the mechanical properties of polymer compositions.

9 Claims, 3 Drawing Sheets

BLOCK COPOLYMERS

BACKGROUND OF THE INVENTION

1. Field of the Invention

The invention relates to block copolymers comprising at least one polyalkadiene block and at least one (aromatic vinyl-co-acrylonitrile) block, and the use thereof as additive for polymers.

Mixtures of polymers can in principle give a wide variety of mechanical properties by adjusting the type and the amount of polymers in mixtures. In particular, mixtures are prepared for the purpose of modifying the impact strength, particularly at lower temperatures, the dimensional stability and the processability.

However, most polymers show no proper miscibility with other polymers, so that no homogeneous product is formed, but a polymer product with many (macroscopic) domains formed by the individual polymers. Such products have no good mechanical properties, in particular not as regards ductility.

Moreover, mixtures of different polymer fractions often occur when reprocessing polymers. In fact, a waste fraction will seldom consist 100% of the same polymer. To yet obtain a product having stable mechanical properties, a homogeneous polymer product must also be realized.

Thus, mixtures of polyethylene, e.g. low density PE, and polyvinyl chloride are inherently brittle. These mixtures are interesting both from the viewpoint of modifying the (mechanical) properties of PVC and for considerations of recycling.

2. Description of the Related Art

In the prior art a lot of research has been done on block copolymers to be used as compatibilizing agent for mixtures of polymers, in particular homopolymers, which per se do not mix together; and as modifier for specific mechanical properties of polymers. Compatibilizing agents reduce the interfacial tension between the immiscible components, so that the polymer mixture can form a dispersion with much smaller domains. These dispersions often have improved ductility.

In spite of the large number of research studies from the prior art, it is still not completely clear which criteria a copolymer must satisfy so as to act as an effective compatibilizing agent. Besides simple diblock copolymers which, on the basis of theoretical predictions, should have the most effective compatibilizing activity, different more complex copolymers have been proposed. Thus, in the prior art random copolymers, graft copolymers, tapered diblock copolymers and low molecular triblock copolymers have been proposed which have an effectiveness higher than that of the simple diblock copolymers.

For the above-mentioned example of polyethylene and polyvinyl chloride, inter alia graft copolymers of PVC or polymethyl methacrylate grafts on polyethylene polymers have been proposed. Thus, an article by Boutevin et al. in Polymer Bulletin 14 (1985) 25–30 describes that the mechanical properties of a PE/PVC mixture can be optimized by adding at least 5 wt. % of a graft copolymer of polyethylene with methyl methacrylate. Besides, the optimization in properties is qualitatively and quantitatively hardly spectacular.

An article by Hajian et al. in Eur. Polym. J. 20 (1984), 135–138 describes the effect of specific copolymers on mixtures of PE and PVC and of PE and polystyrene. Acceptable results are only obtained if the copolymers are used in amounts above 10%.

Block copolymers of, e.g., polybutadiene (PB) and polystyrene (PS) are used to compatibilize, inter alia, polyethylene/polystyrene and polypropylene/polystyrene mixtures. These block copolymers are usually prepared by anionic techniques. Anionic techniques have a number of evident disadvantages. They require strict polymerization conditions, e.g. very pure monomers, an absolute moisture- and oxygen-free atmosphere and cryogenic temperatures. These conditions are hard to realize on an industrial scale.

Moreover, no random copolymers can be obtained by using anionic techniques.

European patent application 0 418 118 describes copolymers prepared by using iniferters.

In an article in Polym. J. 17 (1985) 97, Otsu and Kuriyama describe a process in which random and alternating copolymer sequences could be prepared by using the iniferter technique.

By the term "iniferter" are designated specific free radical initiators which simultaneously also function as chain transfer agent and as polymer radical terminator.

SUMMARY OF THE INVENTION

According to the present invention it has now been found that specific block copolymers of polyalkadiene which may or may not be hydrogenated and poly(aromatic vinyl-co-acrylonitrile) form very effective compatibilizers, in particular for mixtures of polyolefins or polyalkadienes, on the one hand, with polystyrene acrylonitrile (SAN) and with homopolymers with which the poly(aromatic vinyl-co-acrylonitrile) properly mixes, such as poly(methyl methacrylates), polycarbonates, polyvinyl chloride and poly ($\epsilon$-caprolactam), on the other hand.

These specific block copolymers are copolymers comprising at least one blok of a polyalkadiene and at least one block of random poly(aromatic vinyl-co-acrylonitrile). The compatibilizing properties of these block copolymers are substantially better than those of known copolymers, such as copolymers in which random copolymer blocks are grafted on a polymer chain. In the case of using known compatibilizing agents in amounts of 5–10 wt. % and more, based on the complete composition comprising at least two non-compatible polymers, an amount of about 1 wt. % is sufficient when using the copolymers according to the present invention.

More in particular, the invention relates to a polymer composition comprising a first polymer and a second polymer, which second polymer is not compatible with the first polymer, and an amount of a copolymer comprising at least one block of a polyalkadiene and at least one block of random poly(aromatic vinyl-acrylonitrile), the ratio of the block copolymer to the second polymer ranging between 1:50 and 1:5. In a preferred embodiment the first polymer forms a continuous phase in which the second polymer is dispersed. However, blends, such as 50/50 blends, are also possible.

Any random copolymer block, also referred to in this specification as SAN block, which is present in the block copolymer used according to the present invention, is build up from at least acrylonitrile units and units of an aromatic vinyl compound.

The aromatic vinyl compound to be used can be represented by formula I, (I)

in which $R_{1-3}$ may be independently selected from a hydrogen atom, a $C_{1-4}$ alkyl group or a $C_{1-4}$ alkyl group substituted with an inert group; and in which $R_{4-8}$ may independently represent a hydrogen atom, a halogen atom, a $C_{1-4}$ alkyl group or a $C_{1-4}$ alkyl group substituted with an inert group.

Preferably, however, the aromatic vinyl compound is styrene.

The above random copolymers, which can be used according to the present invention, are miscible with polymers, with which also known block copolymers of acrylonitrile and aromatic vinyl are miscible, such as, e.g., with poly(methyl methacrylate), polycarbonate, polyvinyl chloride, poly(ε-caprolactone), and with those known poly(aromatic vinyl-acrylonitrile) block copolymers, such as styrene-co-acrylonitrile copolymers. In the preferred polymer composition according to the invention these polymers can form both the first polymer phase and the second polymer phase.

If required, the degree of miscibility can be adapted to the ratio of acrylonitrile/aromatic vinyl compound in the SAN blocks.

In a preferred embodiment the polymer composition according to the invention comprises a copolymer in which the polyalkadiene blocks present are based on polybutadiene which may or may not be hydrogenated. However, good results are also obtained by using other polyalkadienes, such as polymers of isoprene, pentadienes which may or may not be conjugated, hexadienes which may or may not be conjugated, etc.

These polyalkadiene blocks properly mix with all polymers with which the corresponding homopolymers of the alkadiene monomers also properly mix, in particular with polyalkenes. However, depending on the purpose of adding the copolymer according to the invention, the polyalkadiene can be hydrogenated. When the block copolymer is used as, e.g., compatibilizer in polyalkene-based blends and preferably in polyethylene-based blends, hydrogenated polyalkadiene blocks are used in principle. On the other hand, when the block copolymer is used as modifier for the mechanical properties, in particular as impact modifier, of polymers miscible with SAN, including rubber compositions, it is used in non-hydrogenated form.

Essential for the present invention is that available polymer blocks consisting of acrylonitrile and an aromatic vinyl compound are random polymer blocks. Random polymer blocks turn out to give a much more effective activity than non-random copolymer blocks. The method of preparing this part of the copolymer to be used has to comply with special requirements, and in fact, only free radical polymerization techniques are eligible.

Thus, a polyalkadiene ((random (aromatic vinyl-co-acrylonitrile)-polyalkadiene)$_n$) block copolymer, in which $n \geq 1$ is preferably obtained by thermal copolymerization of an aromatic vinyl compound and acrylonitrile, using polyalkadien-based thermal iniferters as initiators. The iniferters can be obtained in the known manner, e.g. by carrying out end group reactions on, e.g., dihydroxy- and dicarboxy-terminated polyalkadienes.

Suitable copolymers of this type are described in the article Kroeze et al. in Macromolecules 28 (1995) 28, the contents of which document are inserted herein by reference.

In the above-described block copolymers all random (acrylonitrile-co-aromatic vinyl) blocks are surrounded on both sides by polyalkadiene blocks. However, this is not necessary. In fact, similar results are found with block copolymers of the (aromatic vinyl-co-acrylonitrile) block poly(alkadiene) block (aromatic vinyl-co-acrylonitrile) type. Such a triblock copolymer can be prepared using macrophotoiniferters. To this end, dichloro-terminated polyalkadiene, which, for instance, can be obtained by converting dihydroxy- or dicarboxy-terminated polyalkadiene with phosphorus pentachloride, is reacted with a dialkyldithiocarbamate, preferably the sodium salt, and most preferably the sodium salt of diethyldithiocarbamate. This iniferter functions as photoinitiator. In the presence of this compound and using UV light, a block copolymer with two random blocks from the monomer mixture can be obtained from a mixture of monomers (acrylonitrile, aromatic vinyl).

Such polymer structures and such a process are not described in the prior art and also form the subject of the present invention. The invention therefore also relates to a triblock copolymer of the (random aromatic vinyl-co-acrylonitrile)-polyalkadiene-(random aromatic vinyl-co-acrylonitrile) type; and to a process for preparing such a triblock copolymer in which a dichloro-terminated polyalkadiene is contacted with a dialkyldithiocarbamate, preferably the sodium salt thereof, to prepare a photoiniferter which is then brought into a mixture comprising acrylonitrile and aromatic vinyl, which mixture is subjected to a photopolymerization.

The polyalkadiene-poly(random aromatic vinyl-co-acrylonitrile) block copolymers can be hydrogenated in the conventional manner, e.g. with hydrogen, using Raney nickel, nickel on diatomaceous earth, copper chromate, molybdenum sulfide, finely divided platinum on carriers with a small specific surface area etc. only alkene unsaturations are then hydrogenated and, for instance, not the nitrile function.

The block copolymers which form the gist of the present invention not only have favorable compatibilizing properties with which polymer compositions having improved morphology are obtained, using small amounts of compatibilizing agent, viz. compatibilizing agent/blend 1:500–1:50, more preferably 1:200–1:80, and most preferably 1:100. They also have properties leading to improved mechanical properties and in particular improved impact strength. The advantages in morphology modification and improvement in mechanical properties can be obtained with specific compositions in combination.

Thus, the block copolymers in hydrogenated form are very efficient and multifunctional compatibilizing agents for mixtures of polyalkenes with polymers not compatible therewith, such as PVC, PMMA, polycarbonate, poly(ε-caprolactone), and styrene-acrylonitrile copolymers (SAN-copolymers).

They form excellent impact modifiers and compatibilizers for polybutene terephthalate/polycarbonate, polyethylene terephthalate/polycarbonate and polyethylene terephthalate/HDPE/polycarbonate mixtures, which mixtures are used to make plastic bottles that can be recycled.

Besides, the block copolymers can be used as impact modifier for polymers, such as PVC, polycarbonate, poly(ε-caprolactone), SAN copolymers, PMMA, PET and polybutene terephthalate.

On the other hand, as for composition the block copolymer can be adapted to the polymers or polymer mixtures which have to be improved as regards mechanical properties or morphological properties, e.g. by regulating the length of the alkadiene block, the length of the random block or the composition of the random block.

For a proper compatibility with polyalkenes it is generally required that the polyalkene block has a molecular weight of at least about 2,000, more preferably 3,000 or more.

Saturated polyalkene blocks can be excellently combined with linear polyalkenes, which may form both the first phase and the second phase in the polymer compositions according to the invention. When the copolymers are combined with a fraction of branched polyalkenes, the alkadiene monomer can be adapted thereto. Thus, an excellent compatibilizer on the basis of isoprene is obtained for polypropylene-based blends.

The random acrylonitrile-co-aromatic vinyl fraction usually has a molecular weight of at least 15,000–20,000, preferably more than 25,000.

The acrylonitrile/aromatic vinyl compound ratio can readily be adjusted by varying the ratio in the monomer mixture. A research has shown that the acrylonitrile/aromatic vinyl compound ratio in the random block exceeds that in the starting monomer mixture.

For a system in which polybutadiene-(poly(styrene-co-acrylonitrile)-polybutadiene)$_n$ is used as compatibilizing agent for PE/PVC mixtures, an acrylonitrile content in the random block of about 20 wt. %, based on the weight of that block, turns out to give the best results, both as for mechanical properties and as for morphological properties.

With respect to the amount of compatibilizing agent added to a PE/PVC mixture (10/90) a good effect is already obtained with 0.2 wt. %, based on the weight of the complete composition, which effect is optimal when adding about 1 wt. %.

Finally, the use of the block copolymers according to the invention as emulsifier for the rubber phase in rubber-modified polymers, such as PVC, polycarbonate, poly(ε-caprolactone), SAN copolymers, ABS, PMMA, PET and polybutene terephthalate forms the subject of the invention. The emulifier is then used in an amount of 0.2–2 wt. %, more preferably 0.5–1.25 wt. %, and most preferably about 1 wt. %, based on the weight of the complete mixture. Thus, as for volume the emulsified globules of the rubber phase become 5 times smaller when using about 1% emulsifier.

The present invention will now be explained with reference to the following non-limitative examples.

In these examples tensile strength specimens according to ASTM D1708 are prepared by subjecting mixtures to compression molding at 180 or 190° C. After a preheating time of 4 minutes and degassing of the mixture, this compression molding was carried out for 3 min, and the product was quenched in cold water. The tensile strength was measured in an Instron Tensile Tester at room temperature, using a crosshead speed of 10 mm/min. The results of at least 4 tests per specimen were averaged.

The morphology of the mixtures was studied by means of SEM on cryo-fractured specimens, using a JEOL 6320F Field Emission Scanning Electron Microscope.

EXAMPLE 1

Preparation of an Inifer Terpolymer Based on Dihydroxypolybutadiene (According to Steps 1–3 of the Scheme)

25.3 g dihydroxy-terminated polybutadiene (Aldrich) was dissolved in 250 ml toluene and dried by azeotropic distillation. After cooling to room temperature 3.35 g $PCl_5$ were added to the solution. This solution was allowed to stand overnight.

Toluene was removed by vacuum distillation. The polymer was dissolved in chloroform and washed twice with water. This was followed by drying over magnesium sulfate. Then filtration took place, the solvent was evaporated, and the polymer was dried in vacuum.

20 g of the thus obtained chloro-terminated polybutadiene (molecular weight 3300) was dissolved in a three-necked flask in 50 ml toluene under a nitrogen atmosphere. After adding 5.04 g piperazine the system was subjected overnight to reflux. Then the solution was cooled, filtered and extracted with methanol. The polymer was dried in vacuum.

The amine-terminated polybutadiene (20.3 g) was dissolved in 200 ml toluene under a nitrogen atmosphere. Added were 1 ml triethylamine and 1 ml $CS_2$, followed by a solution of $I_2$ in toluene, until the iodine was no longer consumed by the reaction. The mixture was filtered, after which the polymer was precipitated twice from toluene in a large excess of methanol at room temperature.

Thus iniferters were obtained having an average molecular weight of 10400 and an average number of polybutadiene blocks of 2.9.

EXAMPLE 2

Preparation of an Inifer Terpolymer Based on Dicarboxypolybutadiene

Example 1 was repeated starting from dicarboxy-terminated polybutadiene (molecular weight 10200; Scientific Polymer Products Inc.). After the chlorination step no purification took place, but the product was subjected directly to a reaction with an excess of piperazine at −10 to −20° C. The amine-terminated polybutadiene was precipitated in cool methanol (—50° C). The reaction with $CS_2$ was carried out analogously to Example 1.

Thus iniferters were obtained having an average molecular weight of 26500 and an average number of polybutadiene blocks of 2,5 .

EXAMPLE 3

Preparation of a Segmented Block Copolymer (According to Step 4 of the Scheme)

In an ampule an amount of iniferter as prepared in Example 2 was brought under nitrogen atmosphere. Styrene and acrylonitrile were added, after which the ampule was placed in a thermostated oil bath (70° C). After the required polymerization time (95 h) the mixture was precipitated directly in methanol. After a second precipitation from toluene in methanol the obtained block copolymer was filtered off, washed with methanol and dried in vacuum.

Table 1 contains further data of the conducted reactions.

The acrylonitrile content in the obtained polymers was calculated from the nitrogen content which was determined by a known elemental analysis. The nitrogen contents found were corrected for the nitrogen atoms originating from the iniferter. Table 1 shows that the acrylonitrile content in the obtained polymer is higher than in the starting monomer mixture. In fact, acrylonitrile has a higher reactivity in the radical polymerization than styrene.

The average number of alternating blocks in the multiblock copolymers was calculated as follows:

$$N_{pb} = M_{block\ copolymer} \cdot x_{pb}/M_{prepolymer} \quad (1)$$

$$N_{san} = N_{pb} - 1 \quad (2)$$

$$N_{alt} = N_{pb} + N_{san} = 2N_{pb} - 1 \quad (3)$$

in which $x_{pb}$ represents the polybutadiene content of the block copolymer and $N_{pb}$, $N_{san}$ and $N_{alt}$ respectively the average number of polybutadiene blocks, poly(styrene-acrylonitrile) blocks and alternating blocks. The relation (2) follows from the assumption that no -SH end groups are present in the iniferter, which assumption is supported by the fact that no -SH peaks were found in FTIR spectra. From this it follows that all final polymers begin and end with a polybutadiene block.

Table 1: Characteristics of the multiblock copolymers after copolymerizatiom of styrene and acrylonitrile with the iniferter according to Example 2 fraction of acrylonitrile in the monomer feed; and $F_{an}$ for the fraction of acrylonitrile in the block copolymer.

When the SAN block length is plotted against $[M]/[PIn]_{eff}^{1/2}$, it turns out that there is a linear dependence. This means that by selecting a suitable monomer/iniferter ratio the length of the SAN blocks can be adjusted.

The obtained copolymer was hydrogenated in a three-necked flask provided with a reflux cooler under nitrogen atmosphere. To this end, the copolymer was dissolved in dry toluene (about 1 g polymer on 50 ml toluene). Paratoluenesulfonylhydrazide and tri-n-propylamine were added, both in an amount of 2 mol per mol unsaturated alkene. This system was subjected to reflux for 2 h at 110° C. Then the polymer was isolated by washing with deionized water (2×100 ml) and precipitating in methanol. The recovered polymer was dried in vacuum. Proton-NMR measurements showed a degree of hydrogenation of more than 99%.

EXAMPLE 4

Preparation of Polymer Mixtures of PVC and PE

Mixtures of PVC (PVC-LOX; Wavin KLS Hardenberg; NL) and LDPE (Stamylan LD 2100 TN00; DSM Geleen; NL) (90/10) and different amounts of PB(SAN block PB)$_n$, block copolymers were prepared by mixing the components for 5 min. at 200° C. and at a rotation speed of 75 rpm in a co-rotating twin-screw microextruder. Then the mixture was immediately cooled in coldwater. The mixtures were dried fore at least 1 day in vacuum at 40° C.

TABLE 1

| $[M]/[PIn]_{en}^{1/2}$ | $[PIn]_{eff}$ (mmol/l) | $f_{AN}$ in monomer feed (mol. %) | $F_{AN}$ in SAN (mol. %) | $F_{AN}$ in SAN (wt. %) | SAN conversion (%) | $10^{-4}\ M_n$ of block copolymer | Nr: alternating blocks in copolymers | % SAN in block copolymers | SAN block length × $10^{-4}$ |
|---|---|---|---|---|---|---|---|---|---|
| 186.1 | 2.4 | 12.1 | 9.4 | 5.0 | 21.6 | 17.7 | 4,8 | 82 | 6,6 |
| 161.7 | 2.4 | 24.3 | 33.3 | 20.3 | 29.1 | 21.1 | 7,2 | 80 | 5,5 |
| 155.4 | 2.5 | 20.9 | 28.5 | 16.9 | 25.4 | 15.9 | 6,1 | 77 | 4,8 |
| 147.9 | 3.8 | 10.0 | 19.5 | 11.0 | 20.6 | 15.5 | 7,0 | 74 | 3,8 |
| 131.1 | 5.0 | 14.6 | 23.6 | 13.7 | 15.8 | 7.6 | 5,4 | 62 | 2,5 |
| 100.6 | 7.9 | 9.7 | 26.3 | 15.4 | 8.7 | 6.0 | 6,6 | 36 | 0,8 |

In this table [M] stands for the concentration of monomers (styrene and acrylonitrile); $[PIn]_{eff}$ for the effective concentration of iniferter groups in the polymer iniferter; $f_{an}$ for the Tables 2 and 3 contain data of the different mixture components, while Table 4 shows data and results of the obtained mixtures.

TABLE 2

| Code | $F_{AN}$ in SAN (mol %) | $F_{AN}$ in SAN (wt. %) | Mn block copolymer × $10^{-4}$ | Average number alternating blocks in the copolymer | % SAN in block copolymer | PB block length × $10^{-3}$ | SAN block length × $10^{-4}$ |
|---|---|---|---|---|---|---|---|
| EBSAN-5 | 9.4 | 5.0 | 17.7 | 4.8 | 82 | 1.1 | 6.6 |
| EBSAN-11 | 19.5 | 11.0 | 15.5 | 7.0 | 80 | 1.1 | 5.5 |
| EBSAN-17 | 28.5 | 16.9 | 15.9 | 6.1 | 77 | 1.1 | 4.8 |
| EBSAN-20 | 33.3 | 20.3 | 21.1 | 7.2 | 74 | 1.1 | 3.8 |

TABLE 3

| Material | Trade name | $E_{young}$ (GPa) | $\sigma_{yield}$ (MPa) | $\sigma_{break}$ (MPa) | $\epsilon_{yield}$ (%) | $\epsilon_{break}$ (%) | Toughness (MPa) |
|---|---|---|---|---|---|---|---|
| Poly(vinyl chloride) | PVC-LOX | 1.7 | 55.0 | 28.2 | 6.5 | 32 | 13.7 |
|  | Lucovyl RB 8010 | 1.6 | 54.0 | 36.7 | 6.2 | 37.1 | 14.9 |
| LDPE | Stamylan LD 1808 A/ LD 2100 TN00 | 0.1 | 9.4 | 11.6 | 16 | 450 | 47.0 |

TABLE 4

| Compatibilizer | Compatibilizer content (%) | Compression molding temp. (° C.) | $E_{young}$ (GPa) | $\sigma_{yield}$ (MPa) | $\sigma_{break}$ (MPa) | $\epsilon_{yield}$ (%) | $\epsilon_{break}$ (%) | Toughness (MPa) |
|---|---|---|---|---|---|---|---|---|
| — | — | 180 | 1.5 | — | 33.1 | — | 3.8 | 0.8 |
| EBSAN-17 | 0.2 | 180 | 1.4 | 44.8 | 41.5 | 6.8 | 7.7 | 2.5 |
| EBSAN-17 | 0.5 | 180 | 1.5 | — | 46.3 | — | 5.7 | 1.7 |
| EBSAN-17 | 1.0 | 180 | 1.7 | 46.2 | 32.1 | 6.8 | 12.7 | 4.5 |
| EBSAN-17 | 5.0 | 180 | 1.4 | 4.1 | 32.3 | 5.7 | 8.9 | 2.9 |
| EBSAN-20 | 0.2 | 180 | 1.5 | — | 43.4 | — | 6.1 | 1.5 |
| EBSAN-20 | 0.5 | 180 | 1.3 | — | 37.1 | — | 7.4 | 1.8 |
| EBSAN-20 | 1.0 | 180 | 1.2 | — | 40.0 | — | 4.6 | 1.6 |
| EBSAN-20 | 5.0 | 180 | 1.4 | — | 30.2 | — | 3.4 | 0.7 |
| — | — | 190 | 1.3 | — | 40.3 | — | 5.5 | 1.5 |
| EBSAN-5 | 5.0 | 190 | 1.2 | — | 26.4 | — | 3.0 | 0.5 |
| EBSAN-5 | 10.0 | 190 | 1.2 | — | 20.9 | — | 1.8 | 0.2 |
| EBSAN-11 | 5.0 | 190 | 1.2 | — | 32.1 | — | 5.0 | 1.1 |
| EBSAN-11 | 10.0 | 190 | 1.2 | — | 38.2 | — | 6.3 | 1.5 |
| EBSAN-17 | 0.2 | 190 | 1.4 | 44.8 | 28.8 | 5.6 | 11.5 | 3.7 |
| EBSAN-17 | 0.5 | 190 | 1.5 | 44.2 | 35.7 | 5.0 | 16.0 | 5.7 |
| EBSAN-17 | 1.0 | 190 | 1.3 | 43.3 | 30.9 | 6.4 | 20.7 | 6.8 |
| EBSAN-17 | 5.0 | 190 | 1.4 | 44.1 | 33.7 | 5.8 | 22.0 | 7.8 |
| EBSAN-20 | 0.2 | 190 | 1.4 | 45.8 | 28.6 | 5.9 | 12.2 | 4 9 |
| EBSAN-20 | 1.0 | 190 | 1.4 | 46.8 | 35.9 | 5.8 | 29.1 | 10.7 |

Table 4 shows that the compression molding temperature has a considerable effect on the mechanical properties of the mixtures. The beste results are found at a pressing temperature of about 190° C. This difference is possibly to be explained by inferior flow behavior at 180° C.

When the acrylonitrile content in the random block is 5 wt. %, inferior mechanical properties are found; the results for an acrylonitrile content of 11 wt. % give substantially the same properties as when no compatibilizer is added. When using copolymers having acrylonitrile contents of 17 and 20 wt. %, very surprising improvements in properties are found.

These data turn out to correspond to the degree of miscibility of SAN polymers with PVC as described by Kim et al. J. Polym. Sci., Polym. Phys. Edn. 27 (1989) 2211.

Figure 1:
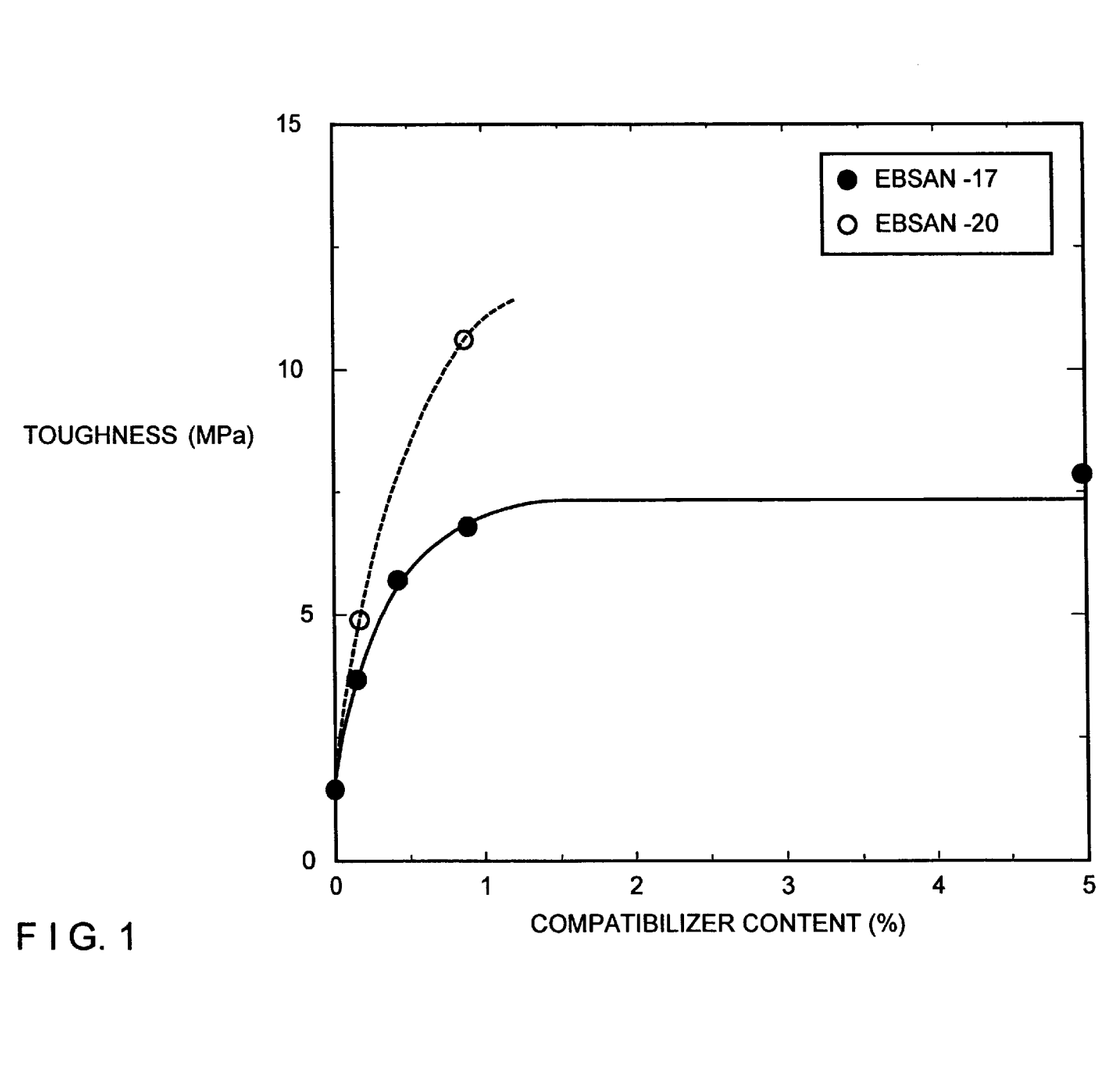
FIG. 1 shows the dependence of the toughness of the mixture on the amount of added EBSAN-17 and EBSAN-2. This figure shows that the toughness of the mixture reaches and maintains a constant level when at least about 1 wt. % block copolymer is added.
Figure 2:
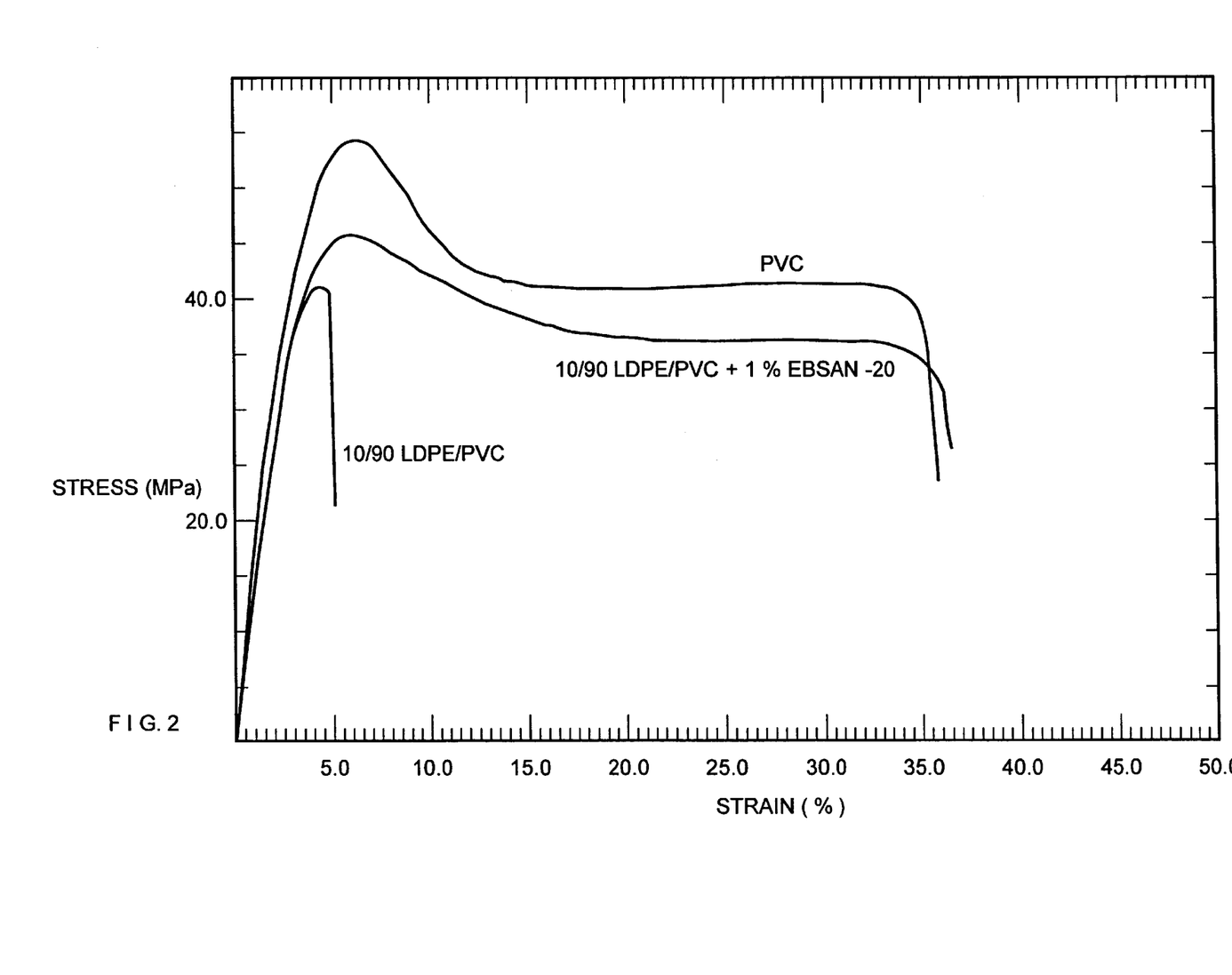
FIG. 2 shows the "stress-strain" behavior of pure PVC-polymer, a 10/90 LDPE/PVC mixture and a 10/90 LDPE/ PVC mixture with EBSAN-20. From this it follows that the mixture with EBSAN-20 shows a behavior comparable to that of pure PVC. Addition of 1% EBSAN-20 gives an increase in the elongation-at-break value by a factor of about with respect to the mixture without EBSAN-20, while the toughness increases by a factor of more than 7.
Figure 3:
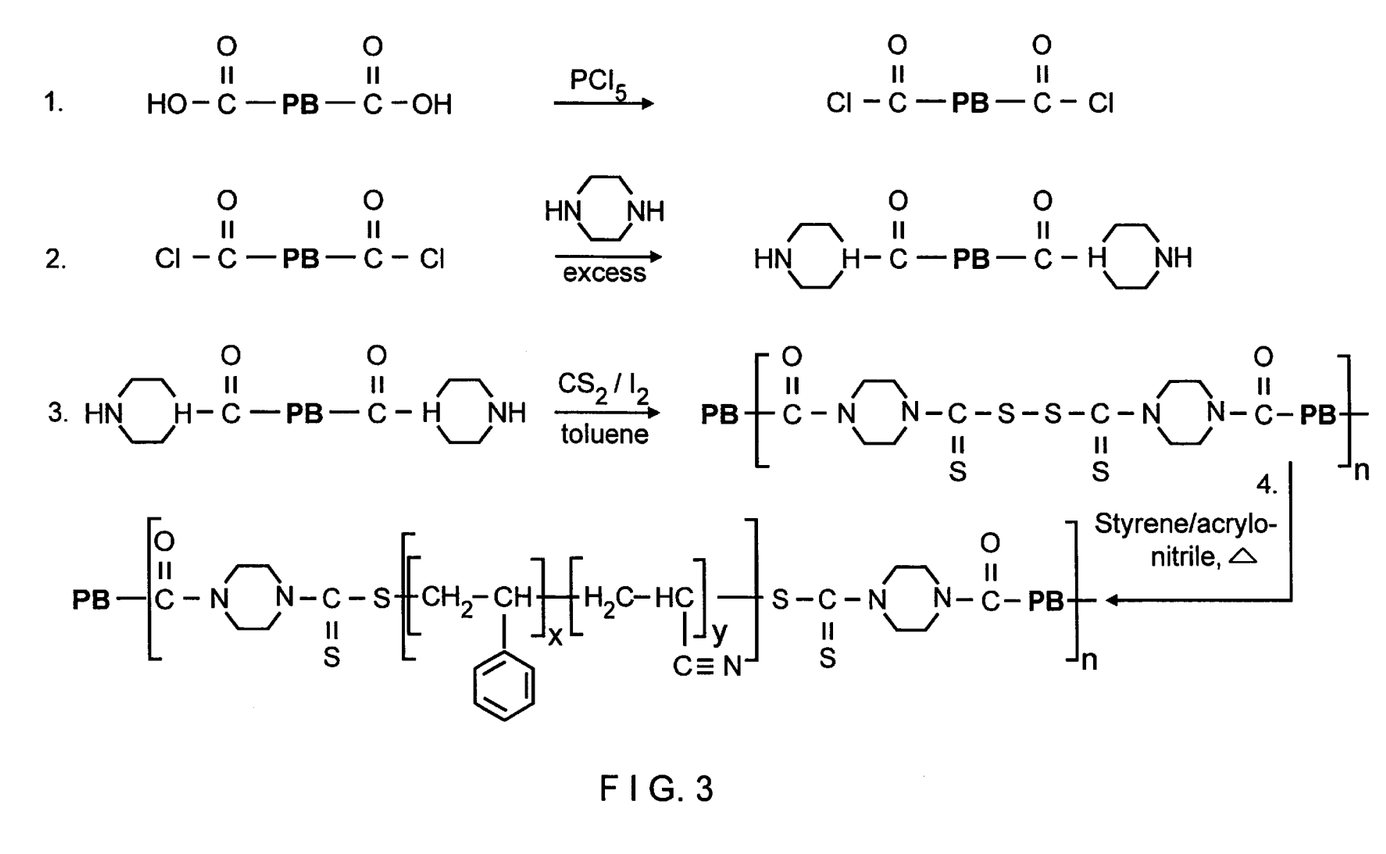
FIG. 3 is a scheme for prepating an iniferter polymer based on dihydroxylpolybutadiene; and a segmented block copolymer.

For all mixtures in which EBSAN-17 or EBSAN-20 was included it was found that no break occurred to the "yield point". This indicates energy dissipation by micromechanical mechanisms, such as "crazing" and "shear yielding", which mechanisms only occur with properly compatibilized dispersions.

This last was confirmed with SEM elektron microscope pictures.

EXAMPLE 5

10/90 LDPE/PVC Mixtures Processed in a Brabender Plasticorder.

Experiments were conducted in a Brabender Plasticorder, in which mixtures were compatibilized with 1% segmented polybutadiene-(SAN block polybutadiene)$_n$ block copolymer under different conditions. More in detail, a mixture of PVC (Lucovyl RB 8010) with LDPE (Stamylan LD 1808 A; DSM Geleen; NL) was prepared in a Brabender Plasticorder at a selected temperature for 5 min. at a rotation speed of 100 rpm. Di-n-octyltin-bis(isooctylthioglycolate) (Irgastab Mok 17A; 2.5 wt. %) was added to the PVC mixture as stabilizer.

Table 5 shows that the results found in the preceding example are confirmed.

TABLE 4

| Compati-bilizer | Compati-bilizer content (%) | Mixing temperature (° C.) | $E_{young}$ (GPa) | $\sigma_{yield}$ (MPa) | $\sigma_{break}$ (MPa) | $\epsilon_{yield}$ (%) | $\epsilon_{break}$ (%) | Toughness (MPa) |
|---|---|---|---|---|---|---|---|---|
| — | 0 | 180 | 1.3 | 37.8 | 29.9 | 5.9 | 16.4 | 5.0 |
| EBSAN-15 | 1.0 | 180 | 1.3 | 39.0 | 28.7 | 6.1 | 12.7 | 3.8 |
| EBSAN-11 | 1.0 | 180 | 1.2 | 36.9 | 27.8 | 5.7 | 13.5 | 3.7 |
| EBSAN-17 | 1.0 | 180 | 1.3 | 39.9 | 33.1 | 5.9 | 22.0 | 7.2 |
| EBSAN-20 | 1.0 | 180 | 1.4 | 46.4 | 35.7 | 6.3 | 43.6 | 14.6 |
| — | 0 | 200 | 1.3 | 36.2 | 21.3 | 5.0 | 13.4 | 4.5 |
| EBSAN-17 | 1.0 | 200 | 1.3 | 39.0 | 32.5 | 6.3 | 24.5 | 6.2 |
| EBSAN-17 | 1.0 | 200 | 1.2 | 41.7 | 34.1 | 7.2 | 20.2 | 6.6 |

EXAMPLE 6

Preparation of a Polybutadiene-photoiniferter

Dihydroxy-terminated polybutadiene (molecular weight 3300; see Example 1) was dissolved in 150 ml toluene and dried by azeotropic distillation of 50 ml toluene. Then the mixture was cooled to room temperature. 3.53 g phosphorus pentachloride were added, and the mixture was stirred overnight. The polymer solution was poured out in cold methanol (−50° C.). The recovered chloro-terminated polybutadiene was dried in vacuum (yield 93%).

The obtained chloro-terminated product was dissolved in a three-necked flask containing 200 ml tetrahydrofuran under nitrogen atmosphere. A twofold excess of sodium diethyldithiocarbamate was added, and this mixture was allowed to reflux overnight. The solution was cooled, filtered and precipitated in cold methanol (−50° C.). The polymer was dried in vacuum at 40° C. Elemental analysis showed that 88% of the end groups were converted to diethyldithiocarbamate end groups.

EXAMPLE 7

Preparation of a Polybutadiene-photoiniferter

Dicarboxy-terminated polybutadiene (molecular weight 10200; see Example 2) was converted to the corresponding dihydroxy-terminated polybutadiene, using a 100% molar excess of lithium aluminium hydride. Then Example 6 was repeated analogously.

EXAMPLE 8

Preparation of a SAN-PB-SAN Triblock Copolymer

In a PYREX flask an amount of the photoiniferter according to Example 6 or 7 was brought under a nitrogen atmosphere. Acrylonitrile and styrene were added. While stirring with a magnet stirrer, the photoiniferter was dissolved. The flask was kept at a distance of 2 cm from an UV lamp (365 nm), and the mixture was subjected to photopolymerization at room temperature.

The reaction mixture was dissolved in tetrahydrofuran and precipitated in methanol at room temperature. After a precipitation of tetrahydrofuran in hexane to remove non-reacted polybutadiene, the obtained triblock copolymers were filtered and dried in vacuum.

Characteristics of the obtained triblock copolymers are shown in Table 6.

TABLE 6

Characteristics of the photo copolymerisations of styrene/acrylonitrile with MI-3300

| [MI]$_{eff}$ | $f_{AN}$ in monomer feed | $F_{AN}$ in SAN | | Consumption MI-3300 | Conversion SAN | Wt. % SAN in block copolymer | Mn block copolymer ($10^4$ g/mol) | | SAN-block length ($10^3$ g/mol) |
|---|---|---|---|---|---|---|---|---|---|
| | | | | | | | theoretical[c] | CPC | |
| (mmol/l)[a] | (mol. %) | (mol. %)[b] | (wt. %)[b] | (wt. %) | (wt. %) | | | | |
| 36.3 | 30.7 | 33.3 | 20.3 | n.d. | n.d. | 92.2 | 4.2 | 3.9 | 15.5 |
| 37.9 | 24.0 | 29.0 | 17.2 | n.d. | n.d. | 89.5 | 3.2 | 3.7 | 12.0 |
| 38.8 | 18.3 | 24.2 | 14.0 | 79.7 | 77.8 | 89.1 | 3.0 | 3.2 | 11.0 |
| 50.7 | 22.5 | 31.5 | 19.0 | 85.5 | 47.0 | 73.2 | 1.3 | 2.0 | 8.2 |
| 58.7 | 21.4 | 29.9 | 18.0 | 63.6 | 55.0 | 78.6 | 1.6 | 1.9 | 7.7 |
| 91.9 | 24.8 | 32.9 | 20.0 | 69.2 | 41.8 | 62.3 | 0.9 | 1.2 | 4.2 |
| 108.3 | 21.6 | 34.3 | 21.0 | 73.2 | 41.9 | 57.1 | 0.8 | 1.2 | 4.2 |
| 101.7 | 26.0 | 44.4 | 28.9 | 78.4 | 37.3 | 55.5 | 0.8 | 1.1 | 4.5 |

[a]effective concentration of iniferter groups in MI-3300.
[b]calculated from %N in block copolymer as determined by elemental analysis, corrected for %N from iniferter groups.
[c]calculated from block copolymer composition determined with $^1$H NMR.

What is claimed is:

1. A stable polymer composition comprising a first polymer and a second polymer, which second polymer is not compatible with the first polymer, and an amount of a block copolymer comprising at least one block of a polyalkadiene and at least one block of random poly(aromatic vinyl-acrylonitrile), and in which the ratio of the block copolymer to the total polymer composition is between 1:500 and 1:50.

2. A polymer composition according to claim 1, wherein the first polymer forms a continuous phase with the second polymer dispersed therein.

3. A polymer composition according to claim 1, wherein the aromatic vinyl compound is represented by formula I, (I)

in which $R_{1-3}$ may be independently selected from a hydrogen atom, a $C_{1-4}$ alkyl group or a $C_{1-4}$ alkyl group substituted with an inert group; and in which $R_{4-8}$ may independently represent a hydrogen atom, a halogen atom, a $C_{1-4}$ alkyl group or a $C_{1-4}$ alkyl group substituted with an inert group.

4. A polymer composition according to claims 1, wherein the aromatic vinyl compound is styrene.

5. A polymer composition according to claim 1, wherein polyalkadiene is polybutadiene.

6. A polymer composition according to claim 1, wherein the block copolymer is polyalkadiene-((random (aromatic vinyl-co-acrylonitrile)-polyalkadiene)$_n$) block copolymer, wherein $n \geq 1$.

7. A polymer composition according to claim 1, wherein the first polymer and the second polymer are polyethylene and polyvinyl chloride or polyvinyl chloride and polyethylene.

8. A polymer composition according to claim 1, wherein the ratio of block copolymer to the first and the second polymer is between 1:200 and 1:80.

9. A polymer composition according to claim 1, wherein the ratio of block copolymer to the first and the second polymer is about 1:100.

* * * * *